United States Patent Office 3,285,924
Patented Nov. 15, 1966

3,285,924
INTERMEDIATES AND PROCESS FOR PREPARING PYRIDOXINE AND RELATED COMPOUNDS
John Mervyn Osbond, Welwyn Garden City, Herts, England, assignor to Hoffmann-La Roche Inc., Nutley, N.J., a corporation of New Jersey
No Drawing. Filed Mar. 19, 1964, Ser. No. 353,241
Claims priority, application Great Britain, Jan. 3, 1962, 209/62; Oct. 10, 1962, 38,356/62; Mar. 21, 1962, 11,167/62
21 Claims. (Cl. 260—294.9)

This application is a continuation-in-part of application Serial No. 247,812, filed December 28, 1962, now abandoned.

This invention relates to a process for the manufacture of pyridoxol (i.e. vitamin $B_6$, pyridoxine), which is a commercially valuable chemical. It is known that pyridoxol can be prepared from 2-methyl-3-hydroxy-4,5-dicarboxy-pyridine and functional derivatives thereof. Pyridoxol can also be prepared from 2-methyl-3-hydroxy-4,5-dihydroxymethyl-pyridine wherein the hydroxy groups exocyclic to the 4- and 5-positions of the pyridine nucleus are etherified. For example, pyridoxol

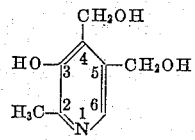

can be prepared from compounds of the formulae

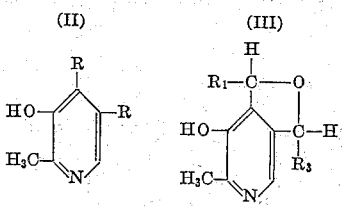

and

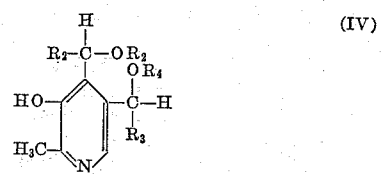

wherein each R is, individually, selected from the group consisting of carboxy, carb-lower alkoxy, cyano, carbonyl halide, formyl, carbamyl, N-lower alkyl carbamyl, N-di(lower alkyl)-carbamyl, and, taken together, anhydride; each of $R_1$ and $R_3$ is selected from the group consisting of hydrogen, hydroxy, lower alkoxy and ar-lower alkoxy; each of $R_2$ and $R_4$ is, individually selected from the group consisting of lower alkyl, ar-lower alkyl, aryl, lower alkanoyl, aroyl and, taken together, oxalyl, phthaloyl, carbonyl, $=C(R_5, R_6)$, and the residue of a dibasic inorganic acid; and each of $R_5$ and $R_6$ is, individually, selected from the group consisting of hydrogen, lower alkyl, aryl, lower alkenyl and, taken together, lower alkylene.

The numbering of the pyridoxol pyridine nucleus is shown above in Formula I for the purpose of convenience.

The present invention comprehends new syntheses for 2-methyl-3-hydroxy-4,5-dicarboxy-pyridine, functional derivatives thereof and 2-methyl-3-hydroxy-4,5-dihydroxymethyl-pyridine wherein the hydroxy groups exocyclic to the 4- and 5-positions of the pyridine nucleus are etherified, which new syntheses form a new manufacturing process for the preparation of pyridoxol.

As used above, "functional derivatives" comprehends variants of the carboxy group in the 4- and 5-position, which functional derivatives are known to be subject to conversion to the carbinol (hydroxymethyl) group found in pyridoxol. Thus, the term "functional derivatives" comprehends lower alkyl esters, primary, secondary or tertiary amides, acid halides, aldehydes, anhydrides and nitriles. Hence, as used above, the term carb-lower alkoxy comprehends a carboxy group esterified by both straight and branched chain saturated hydrocarbon groups such as carbomethoxy, carboethoxy and the like. Furthermore, the term carbamyl comprehends the group $—CONH_2$, and the term anhydride comprehends the group $—CO—O—CO—$. The term carbonyl halide comprehends groups of the formula $—CO$-halide. The term halogen comprehends all four halogens, but chlorine is preferred. The term lower alkyl comprehends both straight and branched chain saturated groups such as methyl, ethyl, propyl and the like.

By, "2-methyl-3-hydroxy-4,5-dihydroxymethyl-pyridine wherein the hydroxy groups exocyclic to the 4- and 5-positions of the pyridine nucleus are etherified," there is meant, for example, compounds of Formulae II and III above. As used therein, the term lower alkoxy comprehends hydrocarbonoxy groups containing both straight and branched chain saturated hydrocarbon groups, for example, methoxy, ethoxy, or the like. Similarly, the term ar-lower alkoxy comprehends groups as benzyloxy and the like. The term aryl comprehends groups such as phenyl and the like. The terms lower alkanoyl and aroyl comprehend groups such as acetyl, benzoyl and the like. The term "residue of a dibasic inorganic acid" comprehends moieties which, together with the two oxygen atoms to which they are attached, form dibasic inorganic acid groups, for example, groups such as phosphate, phosphite, sulfite, carbonate and the like. The symbolic representation $=C(R_5, R_6)$ denotes compounds of Formula IV wherein the hydroxy groups in the 4- and 5-positions are joined together through a methylenedioxy group. Such compounds would be of the formula

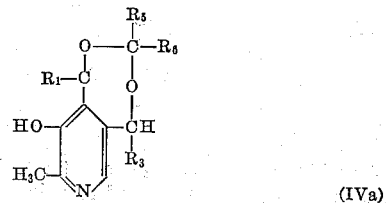

wherein $R_1$, $R_3$, $R_5$ and $R_6$ have the same meaning as above. The term lower alkyl has the same meaning as above. The term lower alkenyl comprehends both straight and branched chain unsaturated hydrocarbon groups such as 2-propenyl and the like. The term lower alkylene comprehends both straight and branched chain saturated hydrocarbon groups having two terminal carbon atoms, such as a polymethylene, for example, pentamethylene.

The invention herein specifically involves a method for the preparation of pyridoxol which comprises reacting 4-methyloxazole with fumaric acid, maleic acid, a functional derivative thereof or a 1,4-but-2-enediol wherein both hydroxy groups are etherified, and adding to the reaction mixture a dehydrogenating agent. More particularly, the invention comprehends a method for the preparation of pyridoxol which comprises reacting 4-methyloxazole with a dienophile selected from the group consisting of compounds of the formulae $$R-CH=CH-R \quad (V)$$

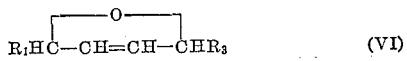
(VI)

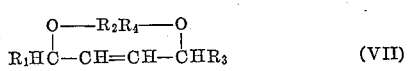
(VII)

wherein R, $R_1$, $R_2$, $R_3$ and $R_4$ have the same meaning as above. Said reaction yields a corresponding pyridine intermediate of Formula II, III or IV, which intermediate is convertible into pyridoxol by known methods. (Reaction with a compound of Formula V yields an intermediate of Formula II; with a compound of Formula VI, an intermediate of Formula III; and with a compound of Formula VII, an intermediate of Formula IV.)

Exemplary dienophiles of Formula V are fumaric acid dimethyl ester, fumaric acid diethyl ester, fumaronitrile, maleic acid dimethyl ester, fumaraldehyde and maleinaldehyde. Exemplary dienophiles containing an epoxy bridge (i.e., of Formula VI) are 2,5-dihydroxy-2,5-dihydrofuran, 2,5-di(lower alkoxy)-2,5-dihydrofuran and 2,5-dihydrofuran. Exemplary dienophiles of Formula VII wherein $R_2$ and $R_4$ are taken together to form a cyclic acetal or ketal are of the formula

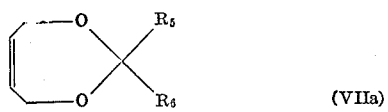
(VIIa)

wherein $R_5$ and $R_6$ have the same meaning as above, and are 4,1-dihydro-1,3-dioxepin,
2-phenyl-4,7-dihydro-1,3-dioxepin,
2-methyl-4,7-dihydro-1,3-dioxepin,
2,2-dimethyl-4,7-dihydro-1,3-dioxepin,
2-n-propyl-4,7-dihydro-1,3-dioxepin,
2-isopropyl-4,7-dihydro-1,3-dioxepin and
2,2-pentamethylene-4,7-dihydro-1,2-dioxepin.

Preferred dienophiles of Formula VIIa are 2-lower alkyl-4,7-dihydro-1,3-dioxepins, especially 2-methyl-4,7-dihydro-1,3-dioxepin and 2-isopropyl-4,7-dihydro-1,3-dioxepin. Exemplary of dienophiles of Formula VII derived from dibasic inorganic acids is 2-oxo-4,7-dihydro-1,3-dioxepin, i.e., buten-2-ylen-1,4-carbonate; more particularly, a compound of Formula VII wherein $R_2$ and $R_4$ taken together, are carbonyl; ethyl buten-2-ylen-1,4-phosphate, i.e., a compound of Formula VII wherein $R_2$ and $R_4$ taken together are

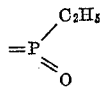

phenyl-buten-2-ylen-1,4-phosphate; and buten-2-ylen-1,4-sulfite, i.e., a compound of Formula VII wherein $R_2$ and $R_4$ taken together are sulfonyl. Examples of dienophiles of Formula VII derived from dibasic organic acids are buten-2-ylen-1,4 oxalate, i.e., a compound of Formula VII wherein $R_2$ and $R_4$, taken together, are oxalyl and buten-2-ylen-1,4 phthalate, i.e., a compound of Formula VII wherein $R_2$ and $R_4$, taken together, are phthaloyl.

Thus, 2-methyl-3-hydroxy-4,5-dicarboxy-pyridine and functional derivatives thereof (i.e., intermediates of Formula II) are known to be convertible into pyridoxol as follows: if free carboxy, carb-lower alkoxy or aldehydo substituents are present, the same can be formed into hydroxymethyl (carbinol) radicals by means of complex metal hydrides such as lithium aluminium hydrides. The same reducing agents can be used for the conversion into pyridoxol of those pyridine derivatives resulting from the reaction of 4-methyloxazole with maleic acid anhydride (i.e., those compounds of Formula II wherein the $R_s$, taken together, are anhydride). The reduction of carboxylic acid halide groups can be effected by catalytic hydrogenation as well as by means of complex metal hydrides. Compounds containing 4- and 5-carbamyl groups can be subjected to dehydration to yield nitriles, which 4,5-cyano compounds are known to be convertible into pyridoxol, e.g. via reduction to aminomethyl groups.

Also, 2 - methyl - 3-hydroxy-4,5-dihydroxymethyl-pyridine wherein the hydroxy groups exocyclic to the 4- and 5-positions of the pyridine nucleus are etherified, can be converted into pyridoxol. For example, when the etherification is in the form of an epoxy linkage (i.e., as in intermediates of Formula III), the conversion can be effected by the procedure of Harris et al., J.A.C.S., 1939, 61: 1245 et seq. and 3307 et seq. When the etherification takes the form of one of the variants represented by the Formula IV, then said intermediate of Formula IV can be hydrolyzed to yield pyridoxol. This hydrolysis can be effected by the use of acids. Thus, acid hydrolysis of a compound of Formula IV will yield the compound of Formula I. The hydrolysis can be effected by both organic and inorganic acids, for example, acetic acid, aqueous hydrochloric acid, alcoholic hydrochloric acid (e.g. a lower alkanoic hydrochloric acid such as methanolic hydrochloric acid or ethanolic hydrochloric acid), aqueous acetic acid/perchloric acid or the like. The strength of the acid is not critical but increased strength results in faster hydrolysis.

The compounds of Formula IV wherein $R_2$ and $R_4$, taken together, are $=C(R_5, R_6)$ and one of $R_5$ and $R_6$ is hydrogen are less susceptible to acid hydrolysis, and it has been found that compounds of Formula IV wherein both $R_5$ and $R_6$ are hydrogen are the slowest to hydrolyze. The acid hydrolysis can be effected at any temperature but elevating the temperature increases the rate of hydrolysis.

In one embodiment of this invention, the compound of Formula I is directly prepared from a compound of Formula VI or VII (via reaction with 4-methyloxazole) without isolation of the intermediate compounds of Formula III or IV. In other words, the product of the condensation of a compound of Formula VI or a compound of Formula VII and 4-methyl oxazole is subjected to acid hydrolysis in situ without being isolated. This can be effected by simple addition of an acid, as described above, to the reaction mixture.

The term dehydrogenation agent, as used herein, comprehends nitrobenzenes, halogenated ketones, inorganic salts useful for said purpose, quinones, bromine and dehydrogenation catalysts. The nitrobenzenes and halogenated ketones are preferred agents; but nevertheless, the other agents are also effective. Nitrobenzenes comprehend compounds such as halogenated and/or alkylated (preferably lower alkylated) nitrobenzenes such as 2,5-dichloro-nitrobenzene;
1,3-dichloro-4-nitrobenzene;
1,2-dichloro-3-nitrobenzene;
1-chloro-2-4-dinitrobenzene;
1-chloro-2-nitrobenzene;
1-chloro-4-nitrobenzene;
1-chloro-2-methyl-3-nitrobenzene;
1,2-dimethyl-3-nitrobenzene;
1-methyl-2-nitrobenzene,
1-methyl-3-nitrobenzene and
1-methyl-4-nitrobenzene; and the like.

Thus, preferred nitrobenzene dehydrogenation agents are of the formula

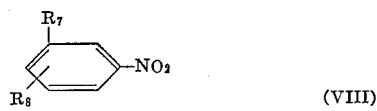
(VIII)

wherein $R_7$ is selected from the group consistiing of nitro, lower alkyl, halo and hydrogen; $R_8$ is selected from the group consisting of lower alkyl, halo and hydrogen.

Especially preferred are compounds of the Formula VIII wherein $R_7$ and $R_8$ are both halo or both hydrogen. Other compounds which may be used as dehydrogenating agents are nitroanilines, such as o-nitro-aniline; 2,4-dinitroaniline; 2,6-dinitro-aniline; and 4-amino-3-nitro-toluene; and other nitro-aromatics such as 1,5-dinitro-naphthalene, o-nitro-anisole, o-nitro-acetophenone and p-nitro-acetophenone. Halogenated ketones are compounds such as hexachloroacetone or the like. Salts useful as dehydrogenating agents are salts such as mercuric acetate and the like. Quinones are compounds such as chloranil (tetrachloro-p-benzoquinone). Dehydrogenation catalysts are agents such as palladium/charcoal in pseudocumene.

In one embodiment of the invention, 4-methyloxazole and a compound selected from the group consisting of compounds of the Formulae V, VI and VII are heated together and, subsequently, the reaction mixture treated with a dehydrogenating agent. According to a preferred embodiment of the invention, 4-methyloxazole and a compound selected from the group consisting of compounds of the Formulae V, VI, and VII are heated in the presence of a dehydrogenating agent.

When using a halogenated ketone, such as hexachloroacetone as the dehydrogenating agent, and a dienophile of Formula V, it is desirable to maintain the temperature at between about 60° C. and about 80° C. It is further advantageous in such a case to include in the reaction mixture a lower alkanoic acid such as acetic acid, propionic acid, butyric acid, isobutyric acid or the like. The reaction can also be conducted using an organic solvent such as methanol, dioxane, triethylamine, N,N-dimethyl-formamide, or the like.

When using a nitrobenzene, for example, a halogenated nitrobenzene, as the dehydrogenating agent, and a dienophile of Formula V, it is desirable to conduct the reaction at a temperature between about 110° C. and about 150° C.

Prolonged heating of the reaction mixture at high temperatures can lead to the destruction of compounds of Formulae II, III or IV and so care must be exercised. Thus, the lower the temperature that is maintained, the longer the time for which the reaction mixture can be safely heated. For example, heating at 110° C.–120° C. for 6 hours or at 150° C. for 2 hours does not unduly harm the product. In the case of intermediates of Formulae III and IV, heating at 150° C.–200° C. for 20 hours does not unduly harm the product. In the case of the preparation of an intermediate of the latter group, i.e. of Formulae III and IV, it is preferred to carry out the reaction of the dienophile of Formulae VI or VII with 4-methyloxazole in the presence of the dehydrogenating agent and under pressure, i.e. a pressure above atmospheric, preferably at 150–200° C. for 10–20 hours. Thus, the reaction can be conducted with pressures of from one atmosphere (i.e. atmospheric pressure) to about 20 atmospheres. It is also preferred to use the dienophile of Formula VI or VII in excess, for example, it is advantageous to use a ratio of about 5 to about 20 moles of dienophile per mole of 4-methyloxazole. When a molar ratio in the upper part of this range is used, the dienophile can act as solvent so that the addition of a separate solvent to the mixture is rendered unnecessary. However, it is preferred, when using only a slight excess of dienophile (i.e. a ratio at the lower end of the above stated range) to add a solvent to the reaction mixture. Useful solvents are, for example, lower alkanoic acids, such as acetic acid, propionic acid and the like. Other solvents, such as lower alkanols, for example methanol, ethers, for example dioxane, tri-lower alkylamines, for example triethylamine or N,N-di-lower alkyl-formamides, for example N,N-dimethyl formamide, are also conveniently used in the dehydrogenation step.

The optimum reaction conditions, of course, vary with the specific dienophile employed and for any specific dienophile can be readily determined by those skilled in the art. For example, when the dienophile used is only slightly active or is inactive at ordinary temperatures and pressures, the first part of the process can be carried out in the presence of the dehydrogenation agent by heating for 20 hours in a closed system at about 150° C.–200° C. The examples to follow further illustrate the selection of reaction conditions.

The condensation of the dienophile with the 4-methyloxazole may be carried out in the presence of an antioxidant such as hydroquinone, or, preferably in an inert atmosphere, such as nitrogen.

The reaction of 4-methyloxazole with a compound selected from the group consisting of compounds of Formulae V, VI and VII, in the presence of a dehydrogenating agent, presumably proceeds first through an intermediate selected from the group consisting of compounds of the formulae:

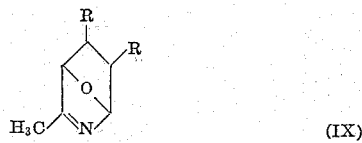
(IX)

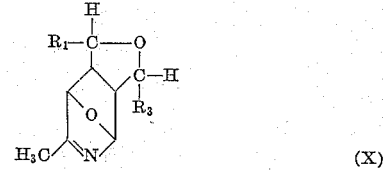
(X)

and

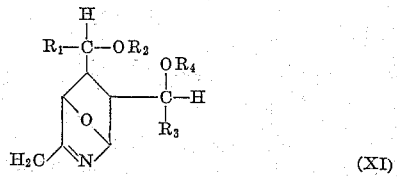
(XI)

wherein R, $R_1$, $R_2$, $R_3$ and $R_4$ have the same meaning as above, which intermediate then opens to the corresponding intermediate of the formulae

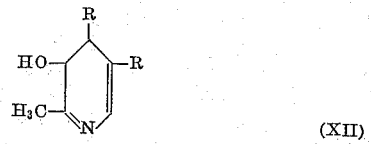
(XII)

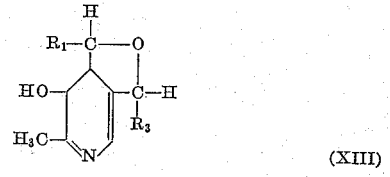
(XIII)

and

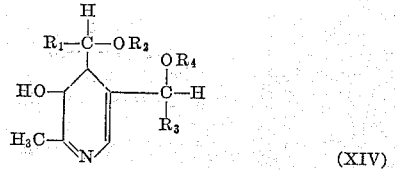
(XIV)

wherein R, $R_1$, $R_2$, $R_3$ and $R_4$ have the same meaning as above. The latter intermediate then loses hydrogen to form the corresponding compound of Formula II, III or IV. The intermediates of Formulae IX, X and XI, on one hand, and of XII, XIII, and XIV, on the other hand, undergo the aforesaid transformations under the conditions of the reaction and, hence, are not isolated.

The 4-methyloxazole starting material used herein can be prepared by chlorination of ethyl acetoacetate, cyclization of the resulting ethyl α-chloro-acetoacetate with formamide and formic acid, hydrolysis of the resulting 4-methyl-5-ethoxy-carbonyloxazole and decarboxylation of the acid so formed.

The following examples are illustrative but not limitative of the invention. All temperatures are stated in degrees centigrade.

Example 1

8.3 g. (0.1 mol.) of 4-methyl-oxazole, 14.4 g. (0.1 mol) of fumaric acid dimethyl ester and 20 ml. of nitro-benzene in a 100 ml. round bottom flask fitted with a good double-surface condenser were heated in an oil-bath at 110°–120° for 6 hours. The resulting dark brown solution was cooled. 20 ml. of methanol were added and the solution treated with ethereal hydrogen chloride until free acid was present. A little ether was added to turbidity, upon which crystallization of the hydrochloride of 2-methyl-3-hydroxy-4,5-di(methoxycarbonyl)-pyridine occurred. The mixture was kept at 0° for 1.5 hours, filtered, washed well with methanol/ether and dried. The pale yellow hydrochloride of 2-methyl-3-hydroxy-4,5-di(methoxycarbonyl)-pyridine had a melting point of 189° (shrinking and frothing) with final decomposition at 215°–217°. A purified sample obtained by crystallization from isopropanol had a melting point of 176–178°; decomposition at 222°.

The base obtained from the hydrochloride (or direct from the reaction mixture) crystallized from petroleum ether (boiling point 60°–80°) as feathery needles of melting point 140.5°–141.5°.

Example 2

8.3 g. (0.10 mol) of 4-methyl-oxazole, 18.9 g. (0.11 mol) of fumaric acid diethyl ester and 24.95 g. (0.13 mol) of 1,3-dichloro-4-nitro benzene in a 100 ml. round bottom flask, fitted with a good double-surface condenser, were warmed slightly and the resulting solution thoroughly shaken until homogeneous. The solution was then heated in an oil bath at 120° for 6 hours. The resulting dark brown solution was cooled and dissolved in 30 ml. of ethanol. To this solution was added, with cooling, a solution of 30 ml. of ether saturated at 5° with hydrogen chloride, and then 50 ml. of ether. The hydrochloride of 2-methyl-3-hydroxy-4,5-di(ethoxycarbonyl)-pyridine crystallized immediately and after storage at 5° for 16 hours, was filtered off and washed with a mixture of 5 ml. of ethanol and 20 ml. of ether, followed by 2 x 25 ml. of ether. The almost colorless hydrochloride of 2-methyl-3-hydroxy-4,5-di(ethoxycarbonyl)-pyridine was dried at 45°–50° in vacuo and had a melting point of 138°–142° (decomposition). Paper chromatography, infrared and ultraviolet spectra show this material to be essentially pure.

Example 3

8.3 g. (0.1 mol) of 4-methyl-oxazole, 18.9 g. (0.11 mol) of fumaric acid diethyl ester and 31.6 g. (0.12 mol) of hexachloroacetone and 7.4 g. (0.1 mol) of propionic acid were heated at 80–85° for 10 hours. To the resulting dark solution a small volume of ether was added and, after cooling, the crystalline 2-methyl-3-hydroxy-4,5-di(ethoxycarbonyl-pyridine hydrochloride of melting point 137°–141° (decomposition) was filtered off. Recrystallibation of the salt from methanol/ether gave the pure ester hydrochloride of melting point 144–148° (decomposition).

Comparison with an authentic sample by mixed melting point and paper chromatography confirmed the structure.

This reaction was also successfully carried out using each of acetic acid, butyric acid and isobutyric acid instead of the propionic acid.

Example 4

Into a 10-liter four-necked round-bottom flask provided with a stirrer, a thermometer, a reflux condenser, and a nitrogen inlet was placed under nitrogen 830 g. of 4-methyl-oxazole, 1890 g. of fumaric acid diethyl ester and 2500 g. of 2,5-dichloro-nitrobenzene. The mixture was heated for 4 hours with an oil bath at 120°.

The cold reaction mixture was poured into a 60-liter extractor containing 3 liters of toluene and 6 liters of ice water. With vigorous stirring 800 ml. of concentrated ammonium hydroxide (approx. 25 percent) was added gradually to form the ammonium salt and establishing a pH of 10.5. After stirring for 2–3 minutes the toluene layer was separated. The aqueous layer was washed with 4 x 600 ml. of toluene and the combined toluene solutions washed with 3 x 1000 ml. of approx. 8 percent ammonium hydroxide. The combined dilute ammonium hydroxide extracts were backwashed with 3 x 600 ml. of toluene. Into a 22-liter four-necked round-bottom flask provided with a stirrer, a reflux condenser, a dropping funnel, and a thermometer was placed 2 liters of chloroform and the combined aqueous extracts. The mixture was cooled with an ice bath to 5° and the free base was formed by the slow addition of approximately 1850 ml. of concentrated hydrochloric acid to establish a pH of 4.5–5.0. After the separation of the chloroform layer the aqueous phase was extracted with 3 x 1 liter of chloroform. The combined chloroform solutions were washed with 2 x 500 ml. of water and the latter back-washed with 500 ml. of chloroform. The combined chloroform solutions were then evaporated at 60° and water aspirator vacuum. The resulting crude residue (1910 g.) was dissolved in 1 liter of anhydrous ethyl alcohol, placed into a 12-liter wide-mouth one-necked round-bottom flask and converted with ice water cooling and stirring to the hydrochloride by the slow addition of 2 liters of 35–40 percent alcoholic hydrogen chloride. Stirring was continued and with efficient cooling, 4.5 liters of anhydrous ether was slowly added to complete crystallization and the mixture was allowed to stand in a refrigerator at 0° overnight. The next morning the precipitate was isolated by filtration on a large Büchner funnel and washed on the funnel twice by removal and thorough mixing with 3 liters of anhydrous ether. The ether-wet hydrochloride (M.P. 147–148°) amounted to 2400 g. The combined filtrate and wash-ether was evaporated under reduced pressure (water aspirator) to a volume of approximately 1–2 liters and ether was added to incipient turbidity. After standing in a refrigerator at 0° overnight the second crop of crystalline hydrochloride was isolated by filtration as described above amounting to 100 g. (ether wet, M.P. 138°. The filtrate again was treated as described above giving a third crop: 21 g., M.P. 124°.

In a 10-liter four-necked round-bottom flask provided with a stirrer, a dropping funnel, and a thermometer, the ether-wet crop (2400 g.) was dissolved in 2.4 liters of water and layered with 2 liters of chloroform. With stirring and ice-water-cooling the hydrochloride was converted to the base with approx. 580 ml. of concentrated ammonium hydroxide by adjusting the pH to 4.5–5.0. After separating the chloroform layer the aqueous phase was extracted with 3 x 1 liter of chloroform and the combined chloroform solutions backwashed with 2 x 500 ml. of water. The combined chloroform solutions were evaporated at 60° and water aspirator vacuum and the resulting residue, subjected to a high vacuum distillation. There was obtained 2-methyl-3-hydroxy-4,5-di(ethoxycarbonyl)-pyridine, B.P. 109–113° (0.02 mm.), M.P. 46°.

Example 5

To a carefully dried 2-liter flask, fitted with a stirrer, dropping funnel, thermometer and nitrogen inlet tube, containing 300 ml. of thoroughly dried tetrahydrofuran were added portionwise, while slowly stirring and passing in nitrogen, 12.33 g. (0.325 mol) of lithium aluminum hydride. The quantity of lithium aluminum hydride used was 30 percent in excess of the amount theoretically required. The warm slightly cloudy solution was cooled to −10° in an ice/salt mixture, and a solution of 50.65 g. (200 ml., 0.2 mol.) of 2-methyl-3-hydroxy-4,5-di(ethoxycarbonyl)-pyridine in 200 ml. of tetrahydrofuran was added thereto over 20 minutes. During the addition the temperature rose to 10°. The resulting yellow mixture was stirred at 0° for 3 hours and then cooled down to −5°. A mixture of 40 ml. of water and 150 ml. of tetrahydrofuran was added dropwise over 15–20 minutes and this was followed by the addition of 600 ml. of approximately 6 N ethanolic hydrogen chloride. The resulting suspension was then warmed to 45°–50° for 0.5 hour with stirring. It was then kept at 20° for 16 hours, filtered, washed with ethanol and subsequently with ether. The crude pyridoxine hydrochloride was dried at 45° in vacuo and had a melting point of 208°–210° (decomposition). By paper chromatography it was shown to consist of one main spot together with a scarcely detectable amount of the 5-lactone.

In order to remove inorganic salts 35.0 g. of the foregoing hydrochloride were suspended in 110 ml. of ethanol and heated under reflux on a water-bath for 5 minutes. The mixture was cooled, filtered and the residue washed with ethanol and ether. The pure pyridoxine hydrochloride had a melting point of 208–210°.

*Example 6*

8.3 g. of 4-methyl-oxazole, 7.8 g. of fumaronitrile, 52.8 g. of hexachloro-acetone and 6.0 g. of acetic acid were heated on an oil-bath at 65° for 27 hours under nitrogen. The mixture was filtered and the dark solid washed with glacial acetic acid. 2-methyl-3-hydroxy-5-cyano-pyridine of melting point 248°–253° was obtained and on crystallization from methanol gave the pure nitrile of melting point 254–255° (decomposition). The ultraviolet absorption spectrum showed $\lambda_{max.}^{EtOH}$ 231 and 296 $m\mu$ ($E_{1\,cm.}^{1\%}$=443 and 429)

The filtrate was evaporated under reduced pressure at 60°–80° to a thick gum when some fumaronitrile (2.0 g.) sublimed into the condenser. The residue was treated with benzene (which was then decanted) and then dissolved in methanol. After cooling to 0°, 2-methyl-3-hydroxy-4,5-dicyano-pyridine crystallized out. Recrystallization from methanol or sublimation at 170°/0.1 mm. gave the pure dinitrile as yellow prisms of melting point 188°–189° (decomposition)

$\lambda_{max.}^{EtOH}$=208.6, 218.3 (inflex.), and 322.6 and 391 $m\mu$ ($E_{1\,cm.}^{1\%}$=1.400, 1.020, 421 and 5.9).

Comparison with an authentic sample confirmed the structure of this compound. This reaction was equally well carried out using half the quantity of hexachloroacetone.

*Example 7*

1.66 g. of 4-methyl-oxazole, 1.56 g. of fumaronitrile and 3.84 g. of 2,5-dichloro-nitrobenzene were heated at 120° for 4.5 hours. The dark reaction mixture was treated with benzene, cooled and filtered. The dark product was dissolved in methanol and crystalline 2-methyl-3-hydroxy-5-cyano-pyridine of melting point 246–251° (decomposition) was filtered off. The methanol motherliquor was shown by paper chromatography, in three different solvent systems, to contain 2-methyl-3-hydroxy-4,5-dicyano-pyridine and this was separated by fractional crystallization using methanol. The final product, however, still contained traces of the mononitrile contaminant.

*Example 8*

0.83 g. of 4-methyl-oxazole, 0.78 g. of fumaronitrile and 1.5 ml. of nitro-benzene were heated at 110°–115° for 16 hours. A mixture of isopropanol/[petroleum ether (40°–60°)] was added and the dark solid was filtered off. The filtrate was extracted several times with hot petroleum ether (boiling point =40°–60°) which removed the tar. The clear orange filtrate was concentrated and the crystalline solid of melting point 36°–39.5° was filtered and recrystallized from petroleum ether to give 2-methyl-4,5-dicyano-pyridine of melting point 60°–61°.

The nitro-benzene layer, after extraction with isopropanol/(petroleum ether), deposited a reddish solid. After filtered and recrystallized from petroleum ether to give 21 methyl-3-hydroxy-5-cyano-pyridine by paper chromatography and mixed melting point. The nitro-benzene solution was then shown to contain traces of the 2-methyl-3-hydroxy-4,5-dicyano-pyridine nitrile by paper chromatography.

*Example 9*

4.15 g. of 4-methyl-oxazole, 7.2 g. of maleic acid dimethyl ester and 10 ml. of nitro-benzene were heated in an oil-bath at 110°–120° for 16 hours. 10 ml. of methanol were added to the dark mixture and an excess of ethereal hydrogen chloride was then added. The crystals which separated on cooling the solution to 0° were removed by filtration and washed with ether. This crude 2-methyl-3-hydroxy-4,5-di(methoxycarbonyl)-pyridine hydrochloride of melting point 220° (frothing at 178°) was purified by recrystallization from methanol/ether.

*Example 10*

0.83 g. of 4-methyl-oxazole and 1.44 g. of maleic acid dimethyl ester were heated in an oil-bath at 110° for 5 hours. The mixture was added to a solution of 6.37 g. of mercuric acetate in 5 ml. of acetic acid and 10 ml. of water at 30°–40°. There was an immediate precipitate of 1.54 g. of mercurous acetate and the mixture was then kept at 20° for 3 hours. The mixture was filtered and the filtrate treated with hydrogen sulphide for 0.25 hour. The filtered solution was evaporated to dryness under reduced pressure and the residue dried by treatment with isopropanol, which was then also removed under reduced pressure. The residue, in isopropanol, was treated with ethereal hydrogen chloride and the 2-methyl-3-hydroxy-4,5-di(methoxycarbonyl)-pyridine hydrochloride of melting point 223°–226° (frothing at 174°–176°) was filtered off and dried.

*Example 11*

2.08 g. of 4-methyl-oxazole, 3.24 g. of maleic acid dimethyl ester and 197 g. of 1-chloro-4-nitro-benzene were heated for 6 hours at 120°. The reaction mixture was cooled and treated with methanol and ethereal hydrogen chloride. The hydrochloride of 2-methyl-3-hydroxy-4,5-di(methoxycarbonyl)-pyridine of melting point 223°–227° was then filtered off.

*Example 12*

2.08 g. of 4-methyl-oxazole, 3.24 g. of fumaric acid dimethyl ester and 5 g. of 1-chloro-4-nitro-benzene were heated at 120° for 4 hours. The hydrochloride of the product was made in the usual way and the 2-methyl-3-hydroxy-4,5-di(methoxycarbonyl)-pyridine hydrochloride of melting point 224° was filtered off, washed with ether and dried.

*Example 13*

2.08 g. of 4-methyl-oxazole, 4.32 g. of fumaric acid dimethyl ester and 6.4 g. of 1,3-dichloro-4-nitro-benzene were heated in an oil-bath at 120° for 6 hours. The hydrochloride of the 2-methyl-3-hydroxy-4,5-di(methoxycarbonyl)-pyridine was prepared in the usual way and had a melting point of 223°.

*Example 14*

200 g. (2.0 mol) of 4,7-dihydro-1,3-dioxepin, 8.3 g. (0.10 mol) of 4-methyl-oxazole, 7.7 g. (0.04 mol) of 2,5-dichloro-nitro-benzene and a little hydroquinone are introduced into a laboratory autoclave. The reaction mixture is heated for 16 hours in an oil-bath of 180° C. The pressure rises to 4.5 atmospheres during the reaction. After completion of the reaction, the content of the autoclave is subjected to distillation at normal pressure and the excess dioxepin is recovered. The distillation residue is taken up in 200 ml. of 1 N hydrochoric acid and the aqueous solution is extracted twice with 75 ml. of ether in order to remove non-basic portions. The acid solution is concentrated to dryness in a rotating evaporator. The crystalline residue is recrystallized from methyl alcohol and gives the hydrochloride of 1,5-dihydro-8-methylpyrido [3,4-e] [1,3] dioxepin-9-ol (melting point 201–204° C.).

5.4 g. (0.025 mol) of the foregoing compound are treated with 25 ml. of ca 25% methanolic hydrochloric acid and the mixture is heated for 3.5 hours in a flask fitted with a Vigreux distillation attachment at a temperature just high enough so that the methylate which forms distills over. Subsequently, the solution is evaporated and the crude crystalline pyridoxine (melting point 203–205° C.) is recrystallized from methyl alcohol. Pyridoxin hydrochloride of melting point 209–210° C. is obtained.

*Example 15*

352.4 g. (2.0 mol) of 2-phenyl-4,7-dihydro-1,3-dioxepin, 8.3 g. (0.10 mol) of 4-methyl-oxazole, 7.7 g. (0.04 mol) of 2,5-dichloro-nitrobenzene and a little hydroquinone are introduced into a laboratory autoclave. The reaction mixture is heated for 16 hours in an oil-bath of 180° C. The pressure rises to 2 atmospheres during the reaction. The content of the autoclave is subjected to distillation under a water-jet vacuum and excess 2-phenyl-4,7-dihydro-1,3-dioxepin is recovered. The distillation residue is taken up in 200 ml. of 1 N hydrochloric acid and the solution is washed twice with 75 ml. of ether. The acid solution is concentrated to dryness in a rotating evaporator. The crystalline residue consisting of pyridoxine hydrochloride is recrystallized from methyl alcohol and gives a product of melting point 204–206° C.

*Example 16*

142.2 g. (1.0 mol) of 2-n-propyl-4,7-dihydro-1,3-dioxepin, 4.15 g. (0.05 mol) of 4-methyl-oxazole, 3.85 g. (0.02 mol) of 2,5-dichloro-nitrobenzene and a little hydroquinone are introduced into a laboratory autoclave. The mixture is heated for 14 hours in an oil-bath of 180° C. The pressure rises to 2 atmospheres during the reaction. The content of the autoclave is subject to distillation in a water-jet vacuum and excess 2-n-propyl-4,7-dihydro-1,3-dioxepin is recovered. The distillation residue is taken up in 100 ml. of 1 N hydrochloric acid and the solution washed twice with 40 ml. of ether. After evaporating the acid solution to dryness, the residue is recrystallized from methyl alcohol. Pyridoxin hydrochloride of melting point 204–205° C. is obtained.

*Example 17*

142.2 g. (1.0 mol) of 2-isopropyl-4,7-dihydro-1,3-dioxepin, 4.15 g. (0.05 mol) of 4-methyl-oxazole, 3.85 g. (0.02 mol) of 2,5-dichloro-nitrobenzene and a little hydroquinone are introduced into a laboratory autoclave. The autoclave is heated for 24 hours in an oil-bath of 180° C. The pressure rises to 2 atmospheres during the reaction. The content of the autoclave is worked up as described in Example 3. Pyridoxin hydrochloride of melting point 202–204° C. is obtained.

*Example 18*

200 g. (2.0 mol) of 4,7-dihydro-1,3-dioxepin, 8.3 g. (0.10 mol) of 4-methyl-oxazole, 4.9 g. (0.04 mol) of nitrobenzene and a little hydroquinone are introduced into a laboratory autoclave. The autoclave is heated for 14 hours in an oil-bath of 180° C. The pressure rises to 3 atmospheres during the reaction. The working up and conversion into pyridoxin hydrochloride is carried out as described in Example 1. A product of melting point 208–209° C. is obtained.

*Example 19*

140.0 g. (2.0 mol) of 2,5-dihydro-furan, 8.3 g. (0.10 mol) of 4-methyl-oxazole, 7.7 g. (0.04 mol) of 2,5-dichloro-nitrobenzene and a little hydroquinone are introduced into a laboratory autoclave. The autoclave is heated for 14 hours in an oil-bath of 180° C., whereupon the pressure rises to 15 atmospheres. The excess 2,5-dihydro-furan is distilled off at normal pressure and the residue is taken up in 200 ml. of 1 N hydrochloric acid. The acid solution is washed twice with 80 ml. of ether and subsequently concentrated to dryness in a rotating evaporator. The crystalline residue is recrystallized from methyl alcohol and gives 2-methyl-3-hydroxy-4,5-epoxy-dimethyl pyridine hydrochloride of melting point 235–240° C. The conversion of this compound into pyridoxin is described in the literature (S. A. Harris and Folkers, J. Am. Chem. Soc. 1939, 61, 1245, 3307).

*Example 20*

8.3 g. (0.1 mol) of 4-methyl-oxazole, 200 g. (1.75 mol) of 2-methyl-4,7-dihydro-1,3-dioxepin and 12.3 g. (0.1 mol) of nitrobenzene were heated in an autoclave at 165° C. (internal temperature) under nitrogen (5 atmospheres) for 46 hours. The reaction mixture was subjected to distillation, the distillate being collected in an ice cooled receiver. Distillation was effected first at 133°/730 mm., 10 ml. of distillate being collected; the remainder was collected at 100°/50 mm. There was thus recovered 160 g. of 2-methyl-4,7-dihydro-1,3-dioxepin containing 0.05% (0.8 g.) of 4-methyl-oxazole.

The semi-crystalline distillation residue was treated with water and steam-distilled until no more nitrobenzene evolved. The hot aqueous fraction was decanted and the remaining substance (tar) was washed with warm water. The aqueous solution, free of tar, was treated with charcoal (1 g.) and filtered. Evaporation to dryness gave a pale yellow solid which was crystallized from 150 ml. of methylethylketone in the form of pale yellow needles of melting point 185–186.5° (9.3 g.). Concentration of the mother liquor gave a second crop of melting point 183–184° C. (1.4 g.). On recrystallisation from methanol there was obtained pure pyridoxine acetal of melting point 189.5–190°.

A solution of 9.75 g. of the pure pyridoxine acetal in 20 ml. of 3 N hydrochloric acid and 30 ml. of water was heated in an open vessel at 80° while a stream of nitrogen was passed through the solution. After 105 minutes the hydrolysis was complete. The solution was filtered and evaporated to dryness. On treating of the crystalline residue with warm ethanol, filtration and drying, there were obtained 9.7 g. of pyridoxine hydrochloride of melting point 205–207°.

What is claimed is:

1. A method for the preparation of a compound selected from the group consisting of compounds of the formulae

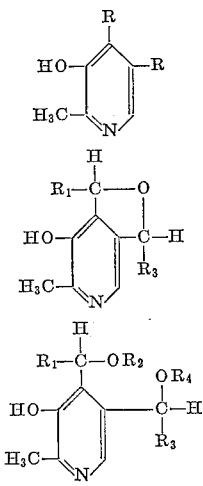

wherein each R is, individually, selected from the group consisting of carboxy, carb-lower alkoxy, cyano, carbonyl halide, formyl, carbamyl, N-lower alkyl carbamyl, N-di(lower alkyl)-carbamyl, and, taken together, anhydride; each of $R_1$ and $R_3$ is selected from the group consisting of hydrogen, hydroxy, lower alkoxy and ar-lower alkoxy; each of $R_2$ and $R_4$ is, individually, selected from the group consisting of lower alkyl, ar-lower alkyl, aryl, lower alkanoyl, aroyl and, taken together, oxalyl, phthaloyl, carbonyl, $=C(R_5, R_6)$, and the residue of a dibasic inorganic acid; and each of $R_5$ and $R_6$ is, individually, selected from the group consisting of hydrogen, lower alkyl, aryl, lower alkenyl and, taken together, lower alkylene; which comprises reacting 4-methyloxazole with a compound selected from the group consisting of compounds of the formulae

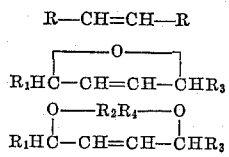

wherein R, $R_1$, $R_2$, $R_3$ and $R_4$ have the same meaning as above, and adding to the reaction mixture a dehydrogenating agent.

2. A process as in claim 1 wherein the reaction is conducted in the presence of the dehydrogenating agent.

3. A process for the preparation of 2-methyl-3-hydroxy-4,5-di(carb-lower alkoxy)-pyridine which comprises reacting 4-methyloxazole with di(lower alkyl)-maleate in the presence of a dehydrogenating agent.

4. A process for the preparation of 2-methyl-3-hydroxy-4,5-di(carb-lower alkoxy)-pyridine which comprises reacting 4-methyloxazole with di(lower alkyl)-fumarate in the presence of a dehydrogenating agent.

5. A process for the preparation of 2-methyl-3-hydroxy-4,5-dicyano-pyridine which comprises reacting 4-methyloxazole with a compound of the formula

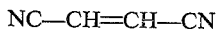

in the presence of a dehydrogenating agent.

6. A process for the preparation of 2-methyl-3-hydroxy-4,5-dicyano-pyridine which comprises reacting 4-methyloxazole with fumaric acid dinitrile in the presence of a dehydrogenating agent.

7. A process as in claim 2 wherein the dehydrogenating agent is a nitrobenzene.

8. A process as in claim 7 wherein the nitrobenzene is a halo-nitrobenzene.

9. A process as in claim 2 wherein the dehydrogenating agent is halogenated ketone.

10. A process as in claim 7 wherein the reaction mixture is heated to a temperature between about 110° C. and about 150° C.

11. A process as in claim 9 wherein the reaction mixture is heated to a temperature between about 60° C. and about 80° C. in the presence of lower alkanoic acid.

12. A process which comprises heating a mixture of 4-methyloxazole, a dehydrogenating agent, and a compound of the Formula R—CH=CH—R, wherein R is, individually, selected from the group consisting of carboxy, carb-lower alkoxy, cyano, carbonyl halide, carbamyl, N-lower alkyl-carbamyl, N-di(lower alkyl)-carbamyl and, taken together, anhydride.

13. A process for the preparation of 1,5-dihydro-3-lower alkyl-8-methyl-pyrido[3,4-e][1,3]-dioxepin-9-ol which comprises reaction of 4-methyloxazole with 4,7-dihydro-2-lower alkyl-1,3-dioxepin in the presence of a dehydrogenating agent.

14. A process for the preparation of 1,5-dihydro-3,8-dimethyl-pyrido[3,4-e][1,3]-dioxepin-9-ol which comprises reaction of 4-methyloxazole with 4,7-dihydro-2-methyl-1,3-dioxepin in the presence of a dehydrogenating agent.

15. A process for the preparation of 1,5-dihydro-3-isopropyl-8-methyl-pyrido[3,4-e][1,3]-dioxepin-9-ol which comprises reaction of 4-methyloxazole with 4,7-dihydro-2-isopropyl-1,3-dioxepin in the presence of a dehydrogenating agent.

16. A process as in claim 14, wherein the dehydrogenating agent is nitrobenzene.

17. A process as in claim 15, wherein the dehydrogenating agent is nitrobenzene.

18. A process as in claim 14, wherein the reaction mixture is heated to a temperature between about 150° C. and about 200° C.

19. A process as in claim 15, wherein the reaction mixture is heated to a temperature between about 150° C. and about 200° C.

20. A compound selected from the group consisting of compounds of the formula

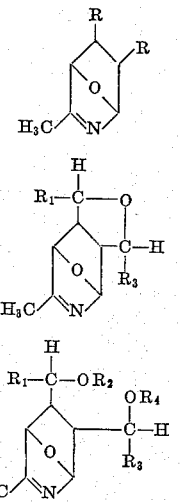

wherein each R is, individually, selected from the group consisting of carboxy, carb-lower alkoxy, cyano, carbonyl halide, formyl, carbamyl, N-lower alkyl carbamyl, N-di(lower alkyl)-carbamyl, and, taken together, anhydride; each of $R_1$ and $R_3$ is selected from the group consisting of hydrogen, hydroxy, lower alkoxy and ar-lower alkoxy; each of $R_2$ and $R_4$ is, individually, selected from the group consisting of lower alkyl, ar-lower alkyl, aryl, lower alkanoyl, aroyl and taken together, oxalyl, phthaloyl, carbonyl, $=C(R_5, R_6)$, and the residue of a dibasic inorganic acid; and each of $R_5$ and $R_6$ is, individually, selected from the group consisting of hydrogen, lower alkyl, aryl, lower alkenyl and, taken together, lower alkylene.

21. A compound selected from the group consisting of compounds of the formulae

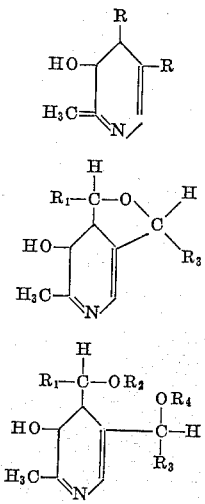

wherein each R is, individually, selected from the group consisting of carboxy, carb-lower alkoxy, cyano, carbonyl halide, formyl, carbamyl, N-lower alkyl carbamyl, N-di (lower alkyl)-carbamyl, and, taken together, anhydride; each of $R_1$ and $R_3$ is selected from the group consisting of hydrogen, hydroxy, lower alkoxy and ar-lower alkoxy; each of $R_2$ and $R_4$ is, individually, selected from the group consisting of lower alkyl, ar-lower alkyl, aryl, lower alkanoyl, aroyl and, taken together, oxalyl, phthaloyl, carbonyl, $=C(R_5, R_6)$, and the residue of a dibasic inorganic acid; and each of $R_5$ and $R_6$ is, individually, selected from the group consisting of hydrogen, lower alkyl, aryl, lower alkenyl and, taken together, lower alkylene.

References Cited by the Examiner

Harris et al.: "J. Org. Chem." vol. 27, pp. 2705–6 (1962).

Huang et al.: "Izo. Akad. Nauk SSSR Odt. Khim. Nawk," pp. 525–6 (1962).

WALTER A. MODANCE, *Primary Examiner.*

ROBERT T. BOND, *Assistant Examiner.*

UNITED STATES PATENT OFFICE
CERTIFICATE OF CORRECTION

Patent No. 3,285,924                          November 15, 1966

John Mervyn Osbond

It is hereby certified that error appears in the above numbered patent requiring correction and that the said Letters Patent should read as corrected below.

In the heading to the printed specification, line 9, for "Mar. 21, 1962" read -- Mar. 21, 1963 --; line 10, for "11,167/62" read -- 11,167/63 --; column 3, line 35, for "4,1-" read -- 4,7- --; line 70, for "aluminum hydrides" read -- aluminum hydride --; column 6, line 40, for "$H_2C$" read -- $H_3C$ --; column 8, line 47, for "(ether wet," read -- (ether wet), --; line 52, after "ether-wet" insert -- first --; column 10, line 7, for "filtered and recrystallized from petroleum ether to give 21" read -- recrystallization this material was shown to be the 2- --.

Signed and sealed this 25th day of June 1968.

(SEAL)
Attest:

EDWARD M. FLETCHER, JR.                      EDWARD J. BRENNER
Attesting Officer                             Commissioner of Patents